(12) United States Patent
Caporal Del Barrio et al.

(10) Patent No.: US 12,273,161 B2
(45) Date of Patent: Apr. 8, 2025

(54) ESTIMATING A LINK BUDGET (71) Applicant: NOKIA TECHNOLOGIES OY, Espoo (FI)

(72) Inventors: Samantha Caporal Del Barrio, Aalborg (DK); Simon Svendsen, Aalborg (DK); Christian Rom, Aalborg (DK); Johannes Harrebek, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 64 days.

(21) Appl. No.: 18/250,450

(22) PCT Filed: Oct. 13, 2021

(86) PCT No.: PCT/FI2021/050681
§ 371 (c)(1),
(2) Date: Apr. 25, 2023

(87) PCT Pub. No.: WO2022/090610
PCT Pub. Date: May 5, 2022

(65) Prior Publication Data
US 2023/0403049 A1    Dec. 14, 2023

(30) Foreign Application Priority Data
Oct. 26, 2020    (FI) ..................................... 20206061

(51) Int. Cl.
*H04L 5/12* (2006.01)
*H04B 7/0408* (2017.01)
(Continued)

(52) U.S. Cl.
CPC ......... *H04B 7/0426* (2013.01); *H04B 7/0408* (2013.01); *H04B 7/0617* (2013.01); *H04B 7/088* (2013.01)

(58) Field of Classification Search
CPC .. H04B 7/0426; H04B 7/0408; H04B 7/0617; H04B 7/088; H04B 17/364;
(Continued)

(56) References Cited

U.S. PATENT DOCUMENTS 10,200,097 B2   2/2019  Kim et al.
10,700,760 B1   6/2020  Berliner et al.
(Continued)

FOREIGN PATENT DOCUMENTS

WO   WO 2020/143920 A1   7/2020
WO   WO 2020/212730 A1   10/2020
WO   WO 2022/012832 A1   1/2022

OTHER PUBLICATIONS

Office Action for Finland Application No. 20206061 dated May 24, 2021, 7 pages.
(Continued)

*Primary Examiner* — Helene E Tayong
(74) *Attorney, Agent, or Firm* — Lippes Mathias LLP (57) ABSTRACT

An apparatus, method and computer program product for: receiving (305) information relating to a power level of a radio beam received by an antenna array, analysing (310) a radio beam power profile associated with the antenna array, determining (315), based on the radio beam power profile, a characteristic of a radio channel, calculating (320), based on the characteristic, an optimum radio beam gain of the antenna array, and estimating (325) a link budget based on the optimum radio beam gain of the antenna array and the information relating to the power level of the radio beam received by the antenna array.

14 Claims, 2 Drawing Sheets

(51) Int. Cl.
*H04B 7/0426* (2017.01)
*H04B 7/06* (2006.01)
*H04B 7/08* (2006.01)

(58) Field of Classification Search
CPC ...... H04B 17/309; H04B 17/318; H01Q 3/26; H04W 24/02; H04W 24/08; H04W 72/046
USPC .......................................................... 375/262
See application file for complete search history.

(56) References Cited

U.S. PATENT DOCUMENTS

| | | | |
|---|---|---|---|
| 2006/0019679 A1* | 1/2006 | Rappaport | G01S 5/02521 455/456.1 |
| 2007/0147533 A1 | 6/2007 | Thomas et al. | |
| 2013/0142270 A1 | 6/2013 | Stirling-Gallacher | |
| 2016/0352012 A1* | 12/2016 | Foo | H04L 25/03343 |
| 2018/0131425 A1 | 5/2018 | Li et al. | |
| 2018/0131434 A1 | 5/2018 | Islam et al. | |
| 2018/0255472 A1 | 9/2018 | Chendamarai Kannan et al. | |
| 2019/0132851 A1 | 5/2019 | Davydov et al. | |
| 2019/0149249 A1 | 5/2019 | Raghavan et al. | |
| 2019/0246301 A1 | 8/2019 | Gheorghiu et al. | |
| 2019/0246340 A1 | 8/2019 | Jung et al. | |
| 2020/0015213 A1* | 1/2020 | Tang | H04B 7/0695 |
| 2020/0037385 A1* | 1/2020 | Park | H04W 56/001 |
| 2020/0220604 A1 | 7/2020 | Simonsson et al. | |

OTHER PUBLICATIONS

"3rd Generation Partnership Project; Technical Specification Group Radio Access Network; NR; Medium Access Control (MAC) protocol specification (Release 16)", 3GPP TS 38.321 v16.1.0, (Jul. 2020), 151 pages.
"3rd Generation Partnership Project; Technical Specification Group Radio Access Network; NR; Radio Resource Control (RRC) protocol specification (Release 16)", 3GPP TS 38.331 v16.1.0, (Jul. 2020), 906 pages.
"3rd Generation Partnership Project; Technical Specification Group Radio Access Network; NR; Requirements for support of radio resource management (Release 16)", 3GPP TS 38.133 v16.4.0, (Jun. 2020), 1463 pages.
"3rd Generation Partnership Project; Technical Specification Group Radio Access Network; Study on channel model for frequencies from 0.5 to 100 GHz (Release 16)", 3GPP TR 38.901 v16.1.0, (Dec. 2019), 101 pages.
CMCC, "Discussion on the baseline performance in FR1", 3GPP TSG RAN WG1 #102e, R1-2006224, (Aug. 17-28, 2020), 6 pages.
Extended European Search Report for European Application No. 21885423.0 dated Feb. 23, 2024, 9 pages.
Ghasempour et al., "Multi-User Multi-Stream mmWave WLANs With Efficient Path Discovery and Beam Steering", IEEE Journal on Selected Areas In Communications, vol. 37, No. 12, (Dec. 2019), 15 pages.
Huawei et al., "Panel-Based UL Beam Selection", 3GPP TSG RAN WG1 Meeting #94bis, R1-1810107, (Oct. 8-12, 2018), 7 pages.
International Search Report and Written Opinion for Patent Cooperation Treaty Application No. PCT/FI2021/050681 dated Jan. 17, 2022, 14 pages.
MacCartney Jr. et al., "Exploiting Directionality for Millimeter-Wave Wireless System Improvement", 2015 IEEE International Conference on Communications (ICC), (Jun. 2015), 7 pages.
Zhang et al., "Coverage and Channel Characteristics of Millimeter Wave Band Using Ray Tracing", IEEE ICC 2015 SAC—Millimeter-wave communications, (Jun. 8-12, 2015), 6 pages.
Zhang et al., "Experimental Characterization of Millimeter-Wave Indoor Propagation channels at 28 GHz", IEEE Access, DOI 10.1109/ACCESS.2018.2882644, (Nov. 21, 2018), 12 pages.

* cited by examiner

ESTIMATING A LINK BUDGET

CROSS-REFERENCE TO RELATED APPLICATIONS

This application is a national phase entry of International Application No. PCT/FI2021/050681, filed Oct. 13, 2021, which claims priority to Finnish Application No. 20206061, filed Oct. 26, 2020, the contents of which are hereby incorporated by reference in their entirety.

TECHNICAL FIELD

The present application relates generally to estimating a link budget. More specifically, the present application relates to calculating an optimum radio beam gain of an antenna array and estimating a link budget based on the optimum radio beam gain.

BACKGROUND

The amount of data increases constantly due to new ways of using user equipment such as streaming content. As a consequence, also users' expectations constantly rise in terms of speed of wireless connections, reliability and/or low power consumption of communication devices.

SUMMARY

Various aspects of examples of the invention are set out in the claims. The scope of protection sought for various embodiments of the invention is set out by the independent claims. The examples and features, if any, described in this specification that do not fall under the scope of the independent claims are to be interpreted as examples useful for understanding various embodiments of the invention.

According to a first aspect of the invention, there is provided an apparatus comprising means for performing: receiving information relating to a power level of a radio beam received by an antenna array, analysing a radio beam power profile associated with the antenna array, determining, based on the radio beam power profile, a characteristic of a radio channel, calculating, based on the characteristic, an optimum radio beam gain of the antenna array, and estimating a link budget based on the optimum radio beam gain of the antenna array and the information relating to the power level of the radio beam received by the antenna array.

According to a second aspect of the invention, there is provided a method comprising: receiving information relating to a power level of a radio beam received by an antenna array, analysing a radio beam power profile associated with the antenna array, determining, based on the radio beam power profile, a characteristic of a radio channel, calculating, based on the characteristic, an optimum radio beam gain of the antenna array, and estimating a link budget based on the optimum radio beam gain of the antenna array and the information relating to the power level of the radio beam received by the antenna array.

According to a third aspect of the invention, there is provided a computer program comprising instructions for causing an apparatus to perform at least the following: receiving information relating to a power level of a radio beam received by an antenna array, analysing a radio beam power profile associated with the antenna array, determining, based on the radio beam power profile, a characteristic of a radio channel, calculating, based on the characteristic, an optimum radio beam gain of the antenna array, and estimating a link budget based on the optimum radio beam gain of the antenna array and the information relating to the power level of the radio beam received by the antenna array.

According to a fourth aspect of the invention, there is provided an apparatus comprising at least one processor and at least one memory including computer program code, the at least one memory and the computer program code configured to with the at least one processor, cause the apparatus at least to: receive information relating to a power level of a radio beam received by an antenna array, analyse a radio beam power profile associated with the antenna array, determine, based on the radio beam power profile, a characteristic of a radio channel, calculate, based on the characteristic, an optimum radio beam gain of the antenna array, and estimate a link budget based on the optimum radio beam gain of the antenna array and the information relating to the power level of the radio beam received by the antenna array.

According to a fifth aspect of the invention, there is provided a non-transitory computer readable medium comprising program instructions for causing an apparatus to perform at least the following: receiving information relating to a power level of a radio beam received by an antenna array, analysing a radio beam power profile associated with the antenna array, determining, based on the radio beam power profile, a characteristic of a radio channel, calculating, based on the characteristic, an optimum radio beam gain of the antenna array, and estimating a link budget based on the optimum radio beam gain of the antenna array and the information relating to the power level of the radio beam received by the antenna array.

According to a sixth aspect of the invention, there is provided a computer readable medium comprising program instructions for causing an apparatus to perform at least the following: receiving information relating to a power level of a radio beam received by an antenna array, analysing a radio beam power profile associated with the antenna array, determining, based on the radio beam power profile, a characteristic of a radio channel, calculating, based on the characteristic, an optimum radio beam gain of the antenna array, and estimating a link budget based on the optimum radio beam gain of the antenna array and the information relating to the power level of the radio beam received by the antenna array.

According to a seventh aspect of the invention, there is provided a system comprising means for: receiving information relating to a power level of a radio beam received by an antenna array, analysing a radio beam power profile associated with the antenna array, determining, based on the radio beam power profile, a characteristic of a radio channel, calculating, based on the characteristic, an optimum radio beam gain of the antenna array, and estimating a link budget based on the optimum radio beam gain of the antenna array and the information relating to the power level of the radio beam received by the antenna array.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Example embodiments relate to predicting an available link budget before performing radio beam management by a terminal device. A terminal device may autonomously estimate an available link budget and decide on a receive radio beam switching in terms of selecting a specific antenna array based on the estimated link budget while taking an optimum radio beam gain into account.

According to an example embodiment, an apparatus is configured to receive information relating to a power level of a radio beam received by an antenna array, analyse a radio beam power profile associated with the antenna array, determine, based on the radio beam power profile, a characteristic of a radio channel, calculate, based on the characteristic, an optimum radio beam gain of the antenna array, and estimate a link budget based on the optimum radio beam gain of the antenna array and the information relating to the power level of the radio beam received by the antenna array. The apparatus may further be configured to decide on a receive radio beam switching in terms of performing antenna array selection based on a first estimated link budget and a second estimated link budget.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
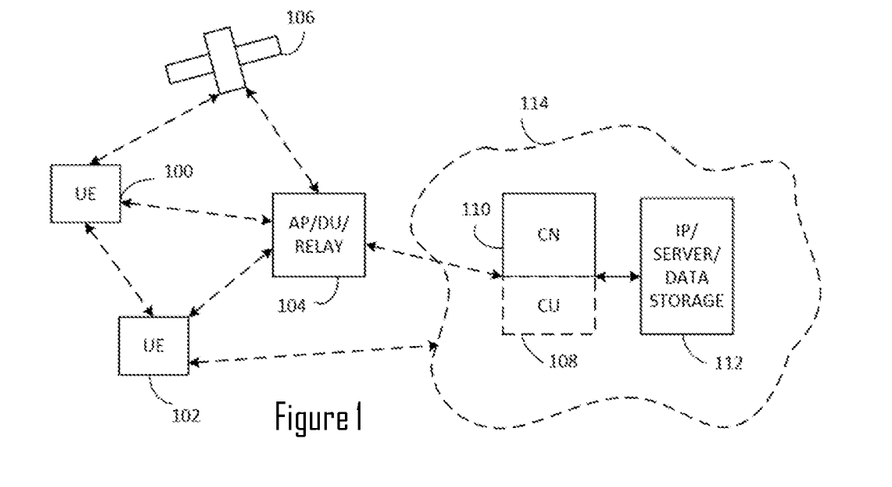
FIG. 1 shows a part of an exemplifying radio access network in which examples of disclosed embodiments may be applied.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system may comprise also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system may comprise more than one (e/g)NodeB in which case the (e/g)NodeBs may also be configured to communicate with one another over links, wired or wireless, designed for the purpose. These links may be used not only for signalling purposes but also for routing data from one (e/g)NodeB to another. The (e/g)NodeB is a computing device configured to control the radio resources of communication system it is coupled to. The (e/g) NodeB may also be referred to as a base station, an access point, an access node, or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The plurality of antennas or antenna elements may be co-located or distributed. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device refers, for example, to a wireless mobile communication device operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, navigation device, vehicle infotainment system, and multimedia device, or any combination thereof. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

A wireless device is a generic term that encompasses both the access node and the terminal device.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of content delivery use cases and related applications including, for example, video streaming, audio streaming, augmented reality, gaming, map data, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low-latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of functions between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or node B (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway, maritime, and/or aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs may be a Home (e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. In multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. A network which is able to use "plug-and-play" (e/g) Node Bs, includes, in addition to Home (e/g)NodeBs (H(e/g)nodeBs), a home node B gateway, or HNB-GW (not shown in FIG. 1). A HNB Gateway (HNB-GW), which may be installed within an operator's network may aggregate traffic from a large number of HNBs back to a core network.

As commonly known in connection with wireless communication systems, control or management information is transferred over a radio interface, e.g. between the terminal device 100 and the access node 104.

Wireless networks are configured to transmit data through radio beams. A radio beam provides an operating channel for transmitting data between a terminal device such as user equipment and a base station such as a gNodeB. A radio beam may be formed, for example, by a phased array antenna that comprises a plurality of antenna elements that are spatially arranged and electrically interconnected.

Beamforming is a spatial filtering technique that comprises directional signal transmission or reception using an array of antenna elements. Directional transmission comprises directing radio energy through a radio channel towards a specific receiver. Directing radio energy may be performed by adjusting the phase and/or amplitude of transmitted signals such that the produced signal corresponds to a desired pattern. Directional reception comprises collecting signal energy from a specific transmitter. Collecting signal energy from a specific transmitter may be performed by changing a received signal in phase and amplitude such that the collected signal corresponds to a desired pattern.

A terminal device may be configured to perform radio beam management in terms controlling directional reception that includes choosing a suitable antenna array and link budget to connect or maintain a connection to network. A terminal device is configured to scan and monitor radio beam reference signals and select the most suitable radio beam. The most suitable radio beam may be, for example, a radio beam with the strongest signal strength. However, selecting the most suitable radio beam based on signal strength might not enable the best link budget after all, because different antenna arrays may have different characteristics and different radio channels may be seen from the different antenna arrays in different circumstances.

Figure 2:
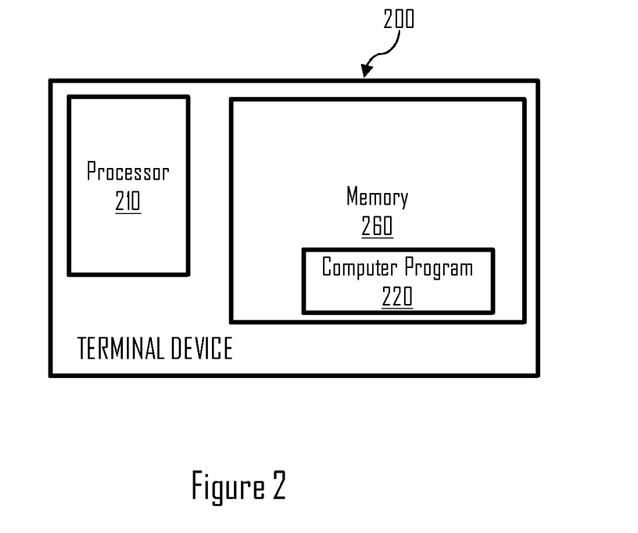
FIG. 2 shows a block diagram of an example device in which examples of the disclosed embodiments may be applied.

FIG. 2 is a block diagram depicting an apparatus 200 operating in accordance with an example embodiment of the invention. The apparatus 200 may be, for example, an electronic device such as a chip, chipset, an electronic module, a terminal device, a network function or an access node such as a base station. The apparatus comprises one or more control circuitry, such as at least one processor 210, and at least one memory 260, including one or more algorithms such as a computer program instructions 220 wherein the at least one memory 260 and the computer program instructions 220 are configured, with the at least one processor 210 to cause the apparatus 200 to carry out any of the example functionalities described below.

In the example of FIG. 2, the processor 210 is a central unit operatively connected to read from and write to the memory 260. The processor 210 may also be configured to receive control signals received via an input interface and/or the processor 210 may be configured to output control signals via an output interface. In an example embodiment the processor 210 may be configured to convert the received control signals into appropriate commands for controlling functionalities of the apparatus.

The memory 260 stores computer program instructions 220 which when loaded into the processor 210 control the operation of the apparatus 200 as explained below. In other examples, the apparatus 200 may comprise more than one memory 260 or different kinds of storage devices.

Computer program instructions 220 for enabling implementations of example embodiments of the invention or a part of such computer program instructions may be loaded onto the apparatus 200 by the manufacturer of the apparatus 200, by a user of the apparatus 200, or by the apparatus 200 itself based on a download program, or the instructions can be pushed to the apparatus 200 by an external device. The computer program instructions may arrive at the apparatus 200 via an electromagnetic carrier signal or be copied from a physical entity such as a computer program product, a memory device or a record medium such as a Universal Serial Bus (USB) stick, a Compact Disc (CD), a Compact Disc Read-Only Memory (CD-ROM), a Digital Versatile Disk (DVD) or a Blu-ray disk.

According to an example embodiment, the apparatus 200 comprises a terminal device. A terminal device may comprise user equipment such as a smartphone, a tablet computer, or the like.

According to an example embodiment, the apparatus 200 comprises a plurality of antenna arrays. According to an example embodiment, the apparatus 200 is operatively connected to a plurality of antenna arrays. Assuming the apparatus 200 comprises a handheld device comprising a plurality of antenna arrays, the plurality of antenna arrays may be provided around the edges of the apparatus 200.

Without limiting the scope of the claims, an advantage of an apparatus comprising a plurality of antenna arrays is that the apparatus may perform beam steering with a large coverage.

Beam steering comprises changing a direction of a main lobe of a radiation pattern. Beam steering may comprise changing a phase of an input signal on radiating elements such as antenna elements. For example, an antenna array may comprise a phased array antenna configured to apply phase control or time delay for radiating antenna elements in order to control a shape and/or a direction of a radio beam provided by the antenna array.

According to an example embodiment, an antenna array comprises a directive antenna array configured to provide a steerable radio beam.

An antenna array may comprise a plurality of antenna elements. An antenna array may comprise, for example, 4-16 antenna elements such as 8 antenna elements. A large antenna array may exhibit a larger number if radio beams with different directivities and beam widths than a small antenna array.

A beam width of the steerable beam may be controlled by a number of activated antenna elements and/or selecting suitable phase shifter configuration for the antenna elements. Broad radio beams may exhibit less gain than narrow radio beams, while broad radio beams may comprise a larger angular spread of power than narrow radio beams.

According to an example embodiment, the apparatus 200 is configured to provide an antenna array with a particular radio beam configuration for controlling the plurality of antenna elements for providing a particular radio beam.

According to an example embodiment the apparatus 200 is configured to receive information relating to at least one radio beam received by at least one antenna array. The information may relate to one or more characteristics of a radio beam such as the power received by an antenna array and/or a shape of a radio beam received by the antenna array.

According to an example embodiment, the apparatus 200 is configured to receive information relating to a power level of a radio beam received by an antenna array.

According to an example embodiment, a power level of a radio beam received by an antenna array comprises a power level received by an antenna array with a first radio beam configuration. According to another example embodiment, a power level of radio beam received by an antenna array comprises a power level of a radio signal received by an antenna array with a first radio beam configuration.

The apparatus 200 may be configured to receive the information relating to a power level of a radio beam by measuring the power level of the radio beam or by receiving the information relating to the power level of the radio beam from a separate device.

According to an example embodiment, the power level of a radio beam comprises reference signal received power (RSRP) or a received signal strength indicator (RSSI) of 3GPP specifications.

According to an example embodiment, the apparatus 200 is configured to analyse information relating to signals received by the antenna array. Information relating to signals received by the antenna array may comprise, for example, measurements relating to different properties of the signals received by the antenna array.

According to an example embodiment, the apparatus 200 is configured to analyse a radio beam power profile associated with the antenna array.

The radio beam power profile may comprise information relating to an angular spread of the radio beam received by the antenna array and changes in an angle of arrival (AoA) of the radio beam received by the antenna array. An angular spread of the radio beam may comprise an angular distribution of radio beam power.

According to an example embodiment, a radio beam power profile associated with the antenna array comprises a radio beam power profile received by the antenna array with a particular radio beam configuration.

A particular radio beam configuration may comprise a plurality of parameters defining configurations for forming a particular receive radio beam using antenna elements of the antenna array. For example, a particular radio beam configuration may comprise parameters for defining a particular radio beam gain, radio beam width, a direction of the radio beam, or the like.

According to an example embodiment, analysing a radio beam power profile comprises analysing a power delay profile. A power delay profile (PDP) of a radio beam may comprise an intensity of a signal obtained through a multipath channel as a function of time delay. A multipath channel may comprise a radio channel through which radio signals may reach an antenna by two or more paths and the time delay may comprise a difference in travel time between multipath arrivals.

According to an example embodiment, the power delay profile comprises angular radio beam power distribution over a predefined period of time.

The radio beam power profile may be obtained by modelling a signal as it propagates through a radio channel. The apparatus 200 may be configured to model a signal as it propagates through a radio channel or the apparatus 200 may be configured to receive from a separate device information relating to modelling a signal as it propagates through a radio channel. A radio channel may be modelled as a linear filter and it may be characterized by its impulse response in time domain.

According to an example embodiment, analysing the radio beam power comprises averaging channel impulse response (CIR) signals received by the antenna array. A CIR comprises a model of a signal as it propagates through a radio channel.

A CIR may comprise different factors relating to a type of a radio channel. For example, a CIR may comprise a path loss between a transmitter and a receiver, a delay spread indicating the amount of dispersion of a signal in time domain and/or an angle of arrival indicating how a property of a received signal such as received power and/or phase changes with an angle of an antenna element.

According to an example embodiment, the apparatus 200 is configured to perform channel assessment based on the radio beam power profile. Channel assessment may comprise, for example, assessing a type of a radio channel based on mobility occurring on the radio channel. Different types of radio channels may comprise, for example, radio channels with different types of radio channel mobility.

According to an example embodiment, the apparatus 200 is configured to determine, based on the radio beam power profile, a characteristic of a radio channel.

A characteristic of a radio channel may relate to a property of the radio channel or an environment of the radio channel. An environment of a radio channel may comprise an environment in which a radio signal propagates.

According to an example embodiment, a characteristic of a radio channel comprises an indication of a radio channel environment. An indication of a radio channel environment may comprise an indication of a degree of mobility in the radio channel.

According to an example embodiment, the apparatus 200 is configured to determine the characteristic of a radio channel by analysing the radio beam power profile. For example, the apparatus 200 may be configured to determine the characteristic of a radio channel by analysing a distribution of signal power received by the antenna array as a function of propagation delays. As another example, the apparatus 200 may be configured to determine the characteristic of a radio channel by analysing the distribution of signal power as a function of angle of arrival of the radio beam received by the antenna array.

According to an example embodiment, the characteristic of the radio channel comprises a radio channel in a static environment or a radio channel in a dynamically changing environment.

A radio channel in a static environment may be referred to as a static radio channel and a radio channel in a dynamically changing environment may be referred to as a dynamic radio channel. A static radio channel may comprise a substantially static multipath environment. A dynamic radio channel may comprise a multipath environment with a plurality of reflections of a signal at different delays over time.

The apparatus 200 may be configured to determine that a radio channel is a static radio channel in response to determining that a parameter value relating to mobility of the radio channel is below a predetermined mobility threshold value. Similarly, the apparatus 200 may be configured to determine that a radio channel is a dynamic radio channel in response to determining that a parameter value relating to mobility of the radio channel is above a predetermined mobility threshold value. The apparatus 200 may be configured to autonomously determine that a radio channel is a static radio channel or a dynamic radio channel.

The apparatus 200 may be configured to categorize different types of radio beam power profiles into a plurality of categories based on the radio beam power profile. Therefore, a characteristic may comprise a particular type of radio beam power profile. For example, if the radio beam power profile comprises a wide angular spread with a substantially similar power distribution over incoming angles, the characteristic may comprise a wide angular spread that applies to static and dynamic radio channels. As another example, if the radio beam power profile comprises a narrow angular spread and the AoA is not significantly changing over time, the characteristic may comprise a static narrow angular spread. As a further example, if the radio beam power profile comprises a narrow angular spread and the AoA is significantly changing over time, the characteristic may comprise a dynamic narrow angular spread.

Without limiting the scope of the claims, an advantage of determining a characteristic of a radio channel based on a radio beam power profile is that factors affecting connectivity may be taken into account before performing radio beam management.

According to an example embodiment, the apparatus 200 is configured to calculate, based on the characteristic, an optimum radio beam gain of the antenna array.

An optimum radio beam gain may comprise an optimum radio beam width for collecting maximum power of the radio beam. An optimum radio beam gain may comprise a radio beam gain provided by the narrowest radio beam that the antenna array is configured to provide, a radio beam gain provided by the widest radio beam that the antenna array is configured to provide or a radio beam gain that antenna array is configured to provide based on one or more instructions from the apparatus 200.

According to an example embodiment, the optimum radio beam gain comprises an optimum radio beam width obtainable by the antenna array.

Calculating an optimum radio beam gain of the antenna array based on a characteristic of a radio channel enables determining an achievable link budget when taking the environment of the radio channel into account. For example, an optimum radio beam gain in a static environment may comprise a radio beam gain provided by the narrowest radio beam as in a static environment a communication link may be maintained using a narrow radio beam providing a large gain. As another example, an optimum radio beam gain in a dynamic environment may comprise a radio beam gain provided by the widest radio beam as in a dynamic environment a communication link may be maintained using a wide radio beam providing a smaller gain than using a narrow radio beam.

Calculating an optimum radio beam gain may comprise mapping a spread of propagation delays of the radio beam to a spread of angles of arrival of the radio beam.

The apparatus 200 may be configured to determine a spread of angles of arrival of the radio beam power based on a spread of propagation delays of the radio beam power. The spread of angles of arrival may be referred to as an angular spread of the radio beam power.

An angular spread of a radio beam may comprise a wide angular spread of a radio beam or a narrow angular spread of a radio beam. A wide angular spread of a radio beam power may comprise an angular spread of the radio beam power above a predefined threshold value and a narrow angular spread of a radio beam power may comprise an angular spread of the radio beam power below a predefined threshold value.

Calculating an optimum radio beam may further comprise correlating a change in the angular spread over time of a radio beam power with different radio beam configurations for determining an optimum beamwidth to collect maximum power.

According to an example embodiment, the apparatus 200 is configured to estimate a link budget based on the optimum radio beam gain of the antenna array and the information relating to the power level of the radio beam received by the antenna array.

Estimating a link budget comprises estimating a total gain and loss to determine a received signal power at the apparatus 200. In other words, estimating a link budget based on an optimum radio beam gain of the antenna array and information relating to a power level of a radio beam received by an antenna array comprises predicting an achievable link budget after connecting to network or switching to a serving antenna array configuration of the apparatus 200.

According to an example embodiment, the optimum radio beam gain corresponds to a second radio beam configuration. The second radio beam configuration may be different from the first radio beam configuration or similar to the first radio beam configuration.

Without limiting the scope of the claims, an advantage of estimating a link budget based on the optimum radio beam gain of the antenna array and the information relating to the power level of the radio beam received by the antenna array is that the apparatus may select an antenna array that enables the best possible communication link in a connected mode of the apparatus. Another advantage is that handovers may be avoided or at least the number of handovers may be reduced. A further advantage is that a more accurate timing of handovers is enabled. A yet further advantage is that maximum power and throughput is enabled and/or the number of antenna array switches and network resources may be optimized.

The apparatus 200 may be configured to adjust the power level of the radio beam received by the antenna array with the optimum radio beam gain in order to enable comparison between different communication links. The apparatus 200 may be configured to adjust the power level of the radio beam received by the antenna array autonomously or based on instructions received from network.

According to an example embodiment, estimating the link budget based on the optimum radio beam gain of the antenna array and the information relating to the power level of the radio beam received by the antenna array comprises adding the optimum beam gain of the antenna array to the power level of the radio beam received by the antenna array.

According to an example embodiment, the apparatus 200 is configured to estimate a link budget for a plurality of antenna arrays. For example, the apparatus 200 may be configured to estimate a first link budget for a first antenna array and a second link budget for a second antenna array.

According to an example embodiment, the estimated link budget comprises a first estimated link budget for a first antenna array and the apparatus 200 is configured to estimate a second link budget for a second antenna array.

Without limiting the scope of the claims, an advantage of estimating a first link budget for a first antenna array and a second link budget for a second antenna array is that a communication link via the first antenna array and a communication link via the second antenna array may be compared with each other while taking different environments into account.

According to an example embodiment, the apparatus 200 is configured to perform antenna array selection based on the first estimated link budget and the second estimated link budget.

Performing antenna arrays selection based on the first estimated link budget and the second estimated link budget may comprise comparing the first estimated link budget and the second estimated link budget. For example, the apparatus 200 may be configured to select the first antenna array for connecting/maintaining a connection to network if the first link budget is better than the second link budget. As another example, the apparatus 200 may be configured to select the second antenna array for connecting/maintaining a connection to network if the second link budget is better than the first link budget.

According to an example embodiment, the apparatus 200 comprises means for performing features of the apparatus 200, wherein the means for performing comprises at least one processor 210, at least one memory 260 including computer program code 220, the at least one memory 260 and the computer program code 220 configured to, with the at least one processor 210, cause the performance of the apparatus 200. The means for performing features of the apparatus 200 may comprise, for example, means for receiving information relating to a power level of a radio beam received by an antenna array, means for analysing a radio beam power profile associated with the antenna array, means for determining, based on the radio beam power profile, a characteristic of a radio channel, means for calculating, based on the characteristic, an optimum radio beam gain of the antenna array, and means for estimating a link budget based on the optimum radio beam gain of the antenna array and the information relating to the power level of the radio beam received by the antenna array.

Assuming the link budget comprises a first link budget for a first antenna array, the apparatus 200 may further comprise means for estimating a second link budget for a second antenna array. The apparatus 200 may further comprise means for performing antenna array selection based on the first estimated link budget and the second estimated link budget.

Figure 3:
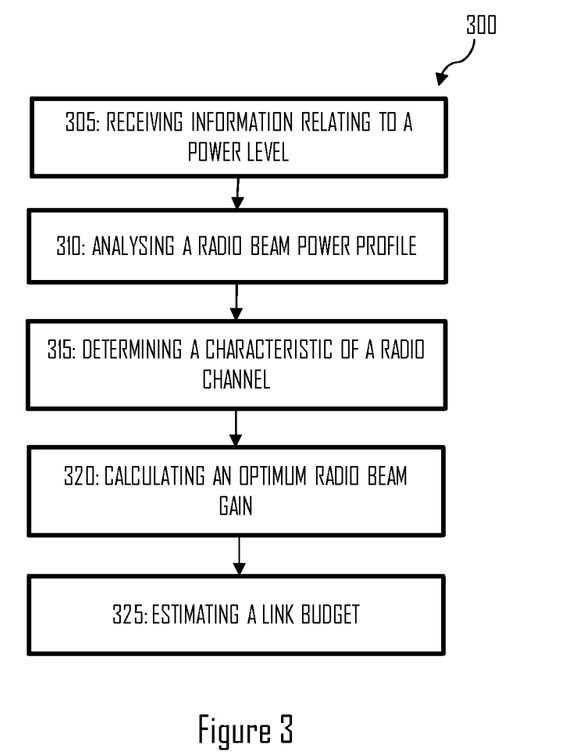
FIG. 3 illustrates an example method according to an example embodiment of the invention.

FIG. 3 illustrates an example method 300 incorporating aspects of the previously disclosed embodiments. More specifically the example method 300 illustrates estimating a link budget based on optimum radio beam gain and information relating to a power level of a radio beam received by an antenna array. The method may be performed, for example, by the apparatus 200.

The method starts with receiving 305 information relating to a power level of a radio beam received by an antenna array. In the example of FIG. 3, the power level of a radio beam received by an antenna array comprises a power level received by an antenna array with a first radio beam configuration. The power level of a radio beam may comprise, for example, reference signal received power (RSRP) or a received signal strength indicator (RSSI) of 3GPP specifications.

The method continues with analysing 310 a radio beam power profile associated with the antenna array. A radio beam power profile associated with the antenna array may comprise a radio beam power profile received by the antenna array with a particular radio beam configuration. A radio beam power profile may comprise, for example, a distribution of radio beam power received by the antenna array.

Analysing a radio beam power profile may comprise analysing a radio beam power profile comprises analysing a power delay profile or analysing a power delay profile or averaging CIR signals received by the antenna array.

The method further continues with determining 315, based on the radio beam power profile, a characteristic of a radio channel. A characteristic of a radio channel may relate to a property of the radio channel or an environment of the radio channel. An environment of a radio channel may comprise an environment in which a radio signal propagates. For example, the characteristic of the radio channel may comprise a radio channel in a static environment or a radio channel in a dynamically changing environment.

The method further continues with calculating 320, based on the characteristic, an optimum radio beam gain of the antenna array.

An optimum radio beam gain may comprise an optimum radio beam width for collecting maximum power of the radio beam. An optimum radio beam gain may comprise a radio beam gain provided by the narrowest radio beam that the antenna array is configured to provide, a radio beam gain provided by the widest radio beam that the antenna array is configured to provide or a radio beam gain that antenna array is configured to provide based on one or more instructions from the apparatus 200. The optimum radio beam gain may comprise, for example, an optimum radio beam width obtainable by the antenna array The method further continues with estimating 325 a link budget based on the optimum radio beam gain of the antenna array and the information relating to the power level of the radio beam received by the antenna array. In the example of FIG. 3, the optimum radio beam gain corresponds to a second radio beam configuration.

Therefore, a power level of a radio beam received by an antenna array may comprise a power level received with a first radio beam configuration and a second radio beam configuration may comprise a radio beam configuration providing the optimum radio beam. The first radio beam configuration and the second radio beam configuration may be different from each other or similar to each other.

Figure 4:
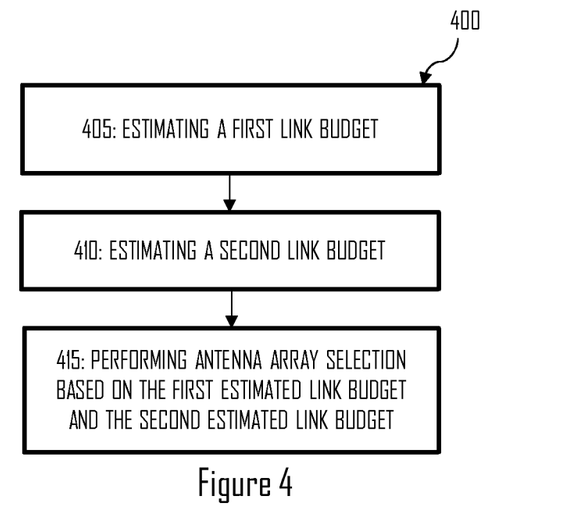
FIG. 4 illustrates another example method according to an example embodiment of the invention.

FIG. 4 illustrates another example method 400 incorporating aspects of the previously disclosed embodiments. More specifically the example method 400 illustrates performing antenna array selection. The method may be performed, for example, by the apparatus 200.

The method starts with estimating 405 a first link budget for a first antenna array. The first link budget may be estimated in a similar manner as illustrated in FIG. 3.

The method continues with estimating 410 a second link budget for a second antenna array. The second link budget may be estimated in a similar manner as illustrated in FIG. 3.

The method further continues with performing 415 antenna array selection based on the first estimated link budget and the second estimated link budget. Performing antenna arrays selection based on the first estimated link budget and the second estimated link budget may comprise comparing the first estimated link budget and the second estimated link budget. For example, the apparatus 200 may be configured to select the first antenna array for connecting/ maintaining a connection to network if the first link budget is better than the second link budget. As another example, the apparatus 200 may be configured to select the second antenna array for connecting/maintaining a connection to network if the second link budget is better than the first link budget.

Without limiting the scope of the claims, an advantage of estimating a link budget based on the optimum radio beam gain of the antenna array and the information relating to the power level of the radio beam received by the antenna array is that an obtainable link budget may be determined before performing radio beam management.

Without in any way limiting the scope, interpretation, or application of the claims appearing below, a technical effect of one or more of the example embodiments disclosed herein is that unnecessary handovers may be avoided. Another technical effect is that maximum obtainable power may be received. A further technical effect is that unnecessary antenna array switches may be avoided. A further technical effect is that use of network resources may be optimized.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments of the present invention may be implemented in software, hardware, application logic or a combination of software, hardware and application logic. The software, application logic and/or hardware may reside on the apparatus, a separate device or a plurality of devices. If desired, part of the software, application logic and/or hardware may reside on the apparatus, part of the software, application logic and/or hardware may reside on a separate device, and part of the software, application logic and/or hardware may reside on a plurality of devices. In an example embodiment, the application logic, software or an instruction set is maintained on any one of various conventional computer-readable media. In the context of this document, a 'computer-readable medium' may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus comprising at least one processor and at least one memory storing instructions that, when executed by the at least one processor, cause the apparatus at least to:
   receive information relating to a power level of a radio beam received by an antenna array;
   analyse a radio beam power profile associated with the antenna array;
   determine, based on the radio beam power profile, a characteristic of a radio channel, wherein the characteristic of the radio channel comprises a radio channel in a static environment or a radio channel in a dynamically changing environment, wherein the radio channel is determined to be a radio channel in a static environment in response to determining that a parameter value relating to mobility of the radio channel is below a predetermined mobility threshold value, and the radio channel is determined to be a radio channel in a dynamically changing environment in response to determining that a parameter value relating to mobility of the radio channel is above a redetermined mobility threshold value;
   calculate, based on the characteristic, an optimum radio beam gain of the antenna array, wherein an optimum radio beam gain in a static environment comprises a radio beam gain provided by the narrowest radio beam, and an optimum radio beam gain in a dynamic environment comprises a radio beam gain provided by the widest radio beam; and
   estimate a link budget based on the optimum radio beam gain of the antenna array and the information relating to the power level of the radio beam received by the antenna array,
   wherein the estimated link budget comprises a first estimated link budget for a first antenna array and the least one memory are configured to with the at least one processor, cause the apparatus to estimate a second link budget for a second antenna array,
   wherein the at least one memory are configured to with the at least one processor, cause the apparatus to perform antenna array selection based on the first estimated link budget and the second estimated link budget.

2. The apparatus according to claim 1, wherein analysing the radio beam power profile comprises analysing a power delay profile and averaging channel impulse response signals received by the antenna array, wherein the channel impulse response comprises a path loss between a transmitter and a receiver, a delay spread indicating the amount of dispersion of a signal in time domain and an angle of arrival indicating how a property of a received signal such as received power and phase changes with an angle of an antenna element.

3. The apparatus according to claim 2, wherein the power delay profile comprises angular radio beam power distribution over a predefined period of time.

4. The apparatus according to claim 1, wherein estimating the link budget based on the optimum radio beam gain of the antenna array and the information relating to the power level of the radio beam received by the antenna array comprises adding the optimum beam gain of the antenna array to the power level of the radio beam received by the antenna array.

5. The apparatus according to claim 1, wherein the optimum radio beam gain comprises an optimum radio beam width obtainable by the antenna array.

6. The apparatus according to claim 1, wherein the power level comprises a reference signal received power (RSRP) or a received signal strength indicator (RSSI) of $3^{rd}$ Generation Partnership Project (3GPP) specifications.

7. The apparatus according to claim 1, wherein the apparatus comprises a terminal device.

8. A method comprising:
receiving information relating to a power level of a radio beam received by an antenna array;
analysing a radio beam power profile associated with the antenna array;
determining, based on the radio beam power profile, a characteristic of a radio channel, wherein the characteristic of the radio channel comprises a radio channel in a static environment or a radio channel in a dynamically changing environment, wherein the radio channel is determined to be a radio channel in a static environment in response to determining that a parameter value relating to mobility of the radio channel is below a predetermined mobility threshold value, and the radio channel is determined to be a radio channel in a dynamically changing environment in response to determining that a parameter value relating to mobility of the radio channel is above a redetermined mobility threshold value;
calculating, based on the characteristic, an optimum radio beam gain of the antenna array, wherein an optimum radio beam gain in a static environment comprises a radio beam gain provided by the narrowest radio beam, and an optimum radio beam gain in a dynamic environment comprises a radio beam gain provided by the widest radio beam; and
estimating a link budget based on the optimum radio beam gain of the antenna array and the information relating to the power level of the radio beam received by the antenna array,
wherein the estimated link budget comprises a first estimated link budget for a first antenna array and estimating a second link budget for a second antenna array,
wherein the method comprises performing antenna array selection based on the first estimated link budget and the second estimated link budget.

9. The method according to claim 8, wherein analysing the radio beam power profile comprises analysing a power delay profile and averaging channel impulse response signals received by the antenna array, wherein the channel impulse response comprises a path loss between a transmitter and a receiver, a delay spread indicating the amount of dispersion of a signal in time domain and an angle of arrival indicating how a property of a received signal such as received power and phase changes with an angle of an antenna element.

10. The method according to claim 9, wherein the power delay profile comprises angular radio beam power distribution over a predefined period of time.

11. The method according to claim 8, wherein estimating the link budget based on the optimum radio beam gain of the antenna array and the information relating to the power level of the radio beam received by the antenna array comprises adding the optimum beam gain of the antenna array to the power level of the radio beam received by the antenna array.

12. The method according to claim 8, wherein the optimum radio beam gain comprises an optimum radio beam width obtainable by the antenna array.

13. The method according to claim 8, wherein the power level comprises a reference signal received power (RSRP) or a received signal strength indicator (RSSI) of $3^{rd}$ Generation Partnership Project (3GPP) specifications.

14. A non-transitory computer readable medium comprising program instructions that, when executed by an apparatus, cause the apparatus to perform at least the following:
receiving information relating to a power level of a radio beam received by an antenna array;
analysing a radio beam power profile associated with the antenna array;
determining, based on the radio beam power profile, a characteristic of a radio channel, wherein the characteristic of the radio channel comprises a radio channel in a static environment or a radio channel in a dynamically changing environment, wherein the radio channel is determined to be a radio channel in a static environment in response to determining that a parameter value relating to mobility of the radio channel is below a predetermined mobility threshold value, and the radio channel is determined to be a radio channel in a dynamically changing environment in response to determining that a parameter value relating to mobility of the radio channel is above a redetermined mobility threshold value;
calculating, based on the characteristic, an optimum radio beam gain of the antenna array, wherein an optimum radio beam gain in a static environment comprises a radio beam gain provided by the narrowest radio beam, and an optimum radio beam gain in a dynamic environment comprises a radio beam gain provided by the widest radio beam; and
estimating a link budget based on the optimum radio beam gain of the antenna array and the information relating to the power level of the radio beam received by the antenna array,
wherein the estimated link budget comprises a first estimated link budget for a first antenna array and wherein the non-transitory computer readable medium comprises program instructions that, when executed by the apparatus, cause the apparatus at least to perform estimating a second link budget for a second antenna array,
wherein the non-transitory computer readable medium comprises program instructions that, when executed by the apparatus, cause the apparatus to perform at least antenna array selection based on the first estimated link budget and the second estimated link budget.

* * * * *